(No Model.)

S. BERGMANN.
FLEXIBLE ELECTRIC CONDUCTOR.

No. 275,748. Patented Apr. 10, 1883.

ATTEST:
E. C. Rowland
H. W. Seely

INVENTOR:
Sigmund Bergmann,
By Richd. N. Dyer,
Atty

UNITED STATES PATENT OFFICE.

SIGMUND BERGMANN, OF NEW YORK, N. Y., ASSIGNOR OF ONE-HALF TO EDWARD H. JOHNSON, OF SAME PLACE.

FLEXIBLE ELECTRIC CONDUCTOR.

SPECIFICATION forming part of Letters Patent No. 275,748, dated April 10, 1883.

Application filed December 6, 1882. (No model.)

*To all whom it may concern:*

Be it known that I, SIGMUND BERGMANN, of New York city, in the county and State of New York, have invented a certain new and useful Improvement in Flexible Electric Conductors, of which the following is a specification.

The object I have in view is to produce a protective and ornamental covering for flexible electrical conducting-cords, which covering will be itself flexible. This I accomplish by constructing a tube of fine metallic wires or threads of brass or other suitable metal, which metallic threads are braided, woven, knit, or otherwise connected together, forming a tube. This flexible covering-tube may be first constructed and then drawn upon the flexible conducting-cord; or the tube may be formed upon the cord by braiding, weaving, knitting, or otherwise forming the metallic threads around and upon such cord. The flexible conducting-cord is constructed in the usual or any suitable way. It has preferably two conductors, each formed of fine wires or metallic threads, the two conductors being insulated from each other and held together by suitable wrappings or coatings of insulating material. The flexible metallic covering is exceedingly ornamental. It also strengthens the cord and protects it, preventing the wearing or destruction of the insulation. This flexible metallic covering for electrical conductors is applicable to many uses. It can be employed wherever flexible conducting-cord is used for electric lights, telephones, and other purposes. It being highly ornamental it may also be employed to cover and conceal the conductors of electroliers, where, on account of peculiar shape or design, or for other reasons, it is not practicable or desirable to run the conductors through the arms of the fixtures.

Figure 2:
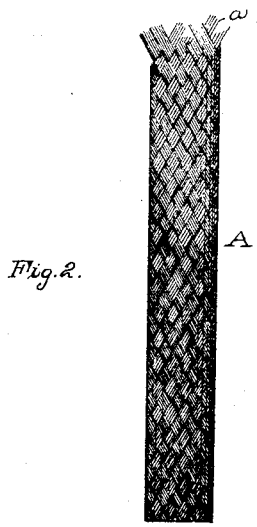
Figure 1:

In the accompanying drawings, forming a part hereof, Figure 1 is an elevation of a flexible conducting-cord provided with the flexible metallic covering, and Fig. 2 a view on a larger scale of the flexible metallic covering.

A is the protective and ornamental metallic tubular covering, composed of fine wires or metallic threads $a$, which are shown for illustration, and are preferably braided into the form of a tube, into which the flexible conducting-cord B is drawn. This cord is composed of two conductors, 1 2, each composed of fine wires or metallic threads, the two conductors being insulated from each other and held together by suitable wrappings, $b$.

What I claim is—

The flexible conducting-cord B, having two conductors, 1 2, each composed of fine wires or metallic threads, and insulated from each other and secured together by wrappings $b$, in combination with the flexible metallic covering A, constructed of fine wires or metallic threads, braided, woven, or knit into tubular form and covering such cord, substantially as set forth.

SIGMUND BERGMANN.

Witnesses:
H. W. SEELY,
E. H. PYATT.